Oct. 31, 1933.   J. W. MOTHERWELL   1,933,383
GAUGE
Filed Oct. 1, 1929
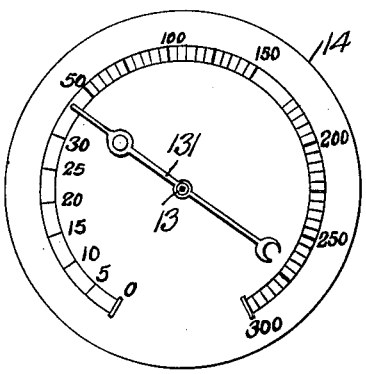
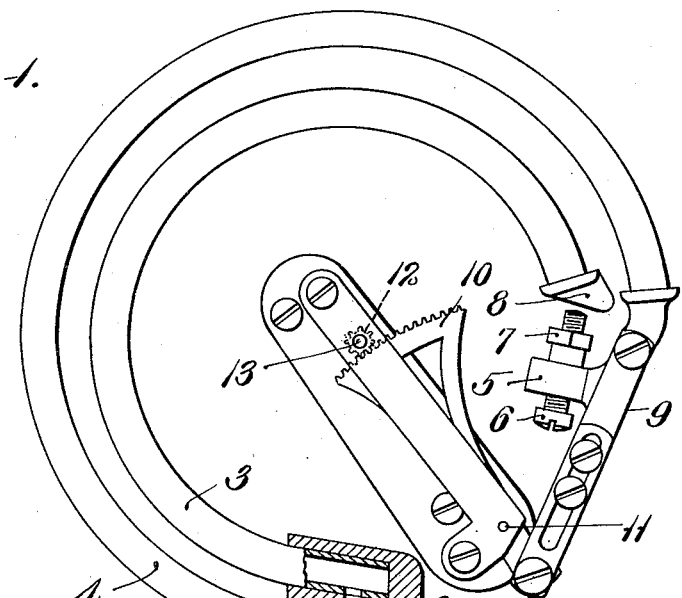
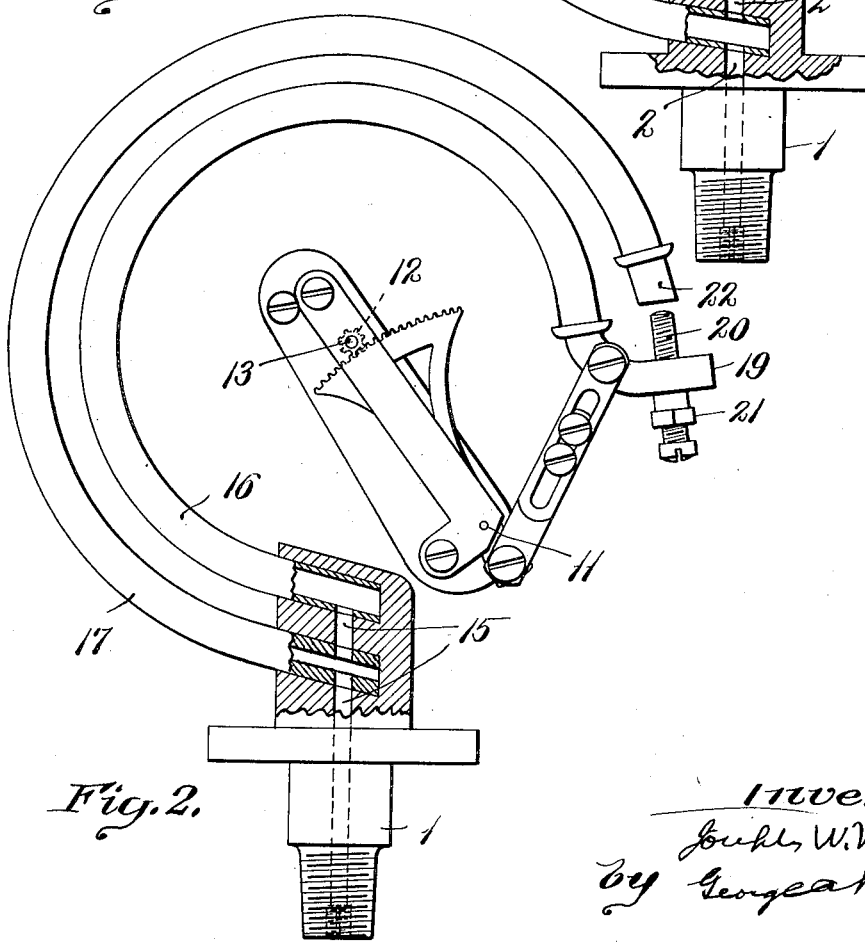
Inventor:
John W. Motherwell
by George A. Rockwell,
Atty.

Patented Oct. 31, 1933

1,933,383

UNITED STATES PATENT OFFICE 1,933,383

GAUGE

Joseph W. Motherwell, Melrose, Mass., assignor to The Ashton Valve Company, Cambridge, Mass., a corporation of Massachusetts Application October 1, 1929. Serial No. 396,557

3 Claims. (Cl. 73—109)

The principal object of my invention is to give a differential reading on a dial so that the pointer or indicator will move through a certain angular distance at one portion of the dial to indicate an increase of a unit of pressure and will move through a different angular distance at another portion of the dial to indicate an equal increase of pressure.

A feature of my invention is a Bourdon tube to operate a pointer or indicator at a desired rate of travel combined with another and less active Bourdon tube to operate at a desired position of the pointer to retard the speed of travel of the first Bourdon tube so as to indicate relatively greater increases of pressure per angular unit of travel of the pointer.

A particular feature of my invention is the use of a plurality of Bourdon tubes, one of which, at the desired point, operatively engages the remainder to retard said remainder.

Other features will be pointed out below.

In the drawing

Figure 1 is an elevation, partly in section, of a gauge mechanism embodying my invention:

Figure 2 is an elevation, partly in section of another form of gauge mechanism embodying my invention; and Figure 3 is an elevation of a dial to be used with the gauge mechanisms of Figures 1 and 2.

A suitable socket connection 1 (in Figure 1) has passage 2 leading to a source of pressure and to the socket are connected, as by soldering or brazing, an active Bourdon tube 3 and an active Bourdon pressure tube 4, both communicating with passage 2. An active Bourdon pressure tube is one that is subjected to pressure and is responsive in movement to changes in pressure. The movable end of tube 4 is closed and has fixed to it a bracket 5 extending beneath the movable end of tube 3, the bracket being threaded internally (not shown) to engage screw 6 which is adjustable on bracket 5 and may be firmly held by check nut 7. The movable end of tube 3 is closed and is provided with a suitable portion 8 to be engaged, when desired, by screw 6. To bracket 5 is pivoted one end of adjustable link 9, the other end being pivotally connected to one end of sector 10 which is suitably pivoted to a fixed portion of the device at 11. The toothed end of the sector engages pinion 12 fixed to shaft 13, said shaft carrying any suitable pointer or indicator 131 to cooperate with the dial 14 shown in Figure 3, the dial and the mechanism so far described to be mounted in a suitable casing which it is not necessary to describe.

In using the form of my device shown in Figure 1 the screw 6 is adjusted as desired so as to engage portion 8 at the desired time. When pressure through passage 2 first expands tube 4 the pointer will move along the dial in Figure 3 from 0 to 30 moving a certain angular distance for each degree of increase of pressure. This continues until the screw 6 engages portion 8 when the tube 3 will retard the movement of the screw and of the sector and pointer so that the latter will move at a slower rate for each degree of increase of pressure and consequently the angular distance along the dial will be less for each such increase. In this way the dial is available to indicate pressure through such range as may be desired with the spacing to indicate each degree further apart angularly at one portion of the dial than at another part.

In the form of Figure 2 the pressure-conducting passage 15 leads to the inner active tube 16, and to the active tube 17. Tube 16 carries bracket 19 at its closed movable end, said bracket carrying screw 20 and check nut 21, the screw being adjustable to engage portion 22 provided at the closed movable end of tube 17, which acts at the desired time to retard the movement of tube 16 and consequently to retard the movement of the pointer which is operated by tube 16 through mechanism which is substantially the same as the corresponding mechanism of Figure 1.

The tube 3 may have a relatively thick wall compared with the thickness of the wall of tube 4 and is therefore less active than tube 4 and consequently the movable end of tube 3 will move more slowly than the movable end of tube 4 so that the screw to be carried by tube 4 will, at the desired time, engage portion 8 with the result that tube 3 will retard the movement of tube 4.

Similarly in Figure 2 the tube 17 may have a relatively thick wall compared with the thickness of the wall of tube 16.

It will be observed that the angular displacement of the pointer is directly proportional to the pressure applied to the more active element, such as tubes 4 and 16, until the adjustable screw engages the end of the less active element, such as tubes 3 and 17, and thereafter the angular displacement of the pointer is uniformly retarded in proportion to the relative inactivity of the less active elements.

What I claim is:

1. A gauge comprising a dial; an indicator cooperating with the dial; an active Bourdon tube tending to move said indicator a certain angular distance along said dial under a certain increase of pressure; and another active Bourdon tube, less active than the first-mentioned tube, and carrying a part to retardingly engage a part carried by the first-mentioned tube at a desired time so as to cause said indicator to move along said dial after said engagement a less angular distance than the first-mentioned distance under an increase of pressure equal to the first-mentioned increase.

2. A gauge comprising a dial; an indicator cooperating with the dial; an active Bourdon tube tending to move said indicator a certain angular distance along said dial under a certain increase of pressure; and another active Bourdon tube, less active than the first-mentioned tube, and carrying a part to retardingly engage a part carried by the first-mentioned tube at a desired time so as to cause said indicator to move along said dial after said engagement a less angular distance than the first-mentioned distance under an increase of pressure equal to the first-mentioned increase; and means to relatively adjust said parts.

3. A gauge comprising a dial; an indicator cooperating with the dial; an active Bourdon tube tending to move said indicator a certain angular distance along said dial under a certain increase of pressure; and another active Bourdon tube, less active than the first-mentioned tube, one of said tubes carrying an adjustable screw and the other tube carrying a part to retardingly engage said screw at a desired time so as to cause said indicator to move along said dial after said engagement a less angular distance than the first-mentioned distance under an increase of pressure equal to the first-mentioned increase.

JOSEPH W. MOTHERWELL.